United States Patent
Khatwa

(10) Patent No.: US 7,551,990 B2
(45) Date of Patent: Jun. 23, 2009

(54) SYSTEM AND METHOD FOR MANAGEMENT OF A GROUND OBSTACLE DISPLAY

(75) Inventor: Ratan Khatwa, Sammamish, WA (US)

(73) Assignee: Honeywell International Inc., Morristown, NJ (US)

(*) Notice: Subject to any disclaimer, the term of this patent is extended or adjusted under 35 U.S.C. 154(b) by 897 days.

(21) Appl. No.: 10/908,261

(22) Filed: May 4, 2005

(65) Prior Publication Data

US 2006/0253231 A1  Nov. 9, 2006

Related U.S. Application Data

(60) Provisional application No. 60/674,223, filed on Apr. 21, 2005.

(51) Int. Cl.
G08G 5/04 (2006.01)
G01S 13/94 (2006.01)

(52) U.S. Cl. ................ 701/9; 340/970; 340/977

(58) Field of Classification Search .......... None
See application file for complete search history.

(56) References Cited

U.S. PATENT DOCUMENTS

| | | | |
|---|---|---|---|
| 4,646,244 A | 2/1987 | Bateman et al. | |
| 5,839,080 A | 11/1998 | Muller et al. | |
| 5,884,223 A * | 3/1999 | Tognazzini | 701/301 |
| 6,469,664 B1 | 10/2002 | Michaelson et al. | |
| 6,734,808 B1 | 5/2004 | Michaelson et al. | |
| 6,750,815 B2 | 6/2004 | Michaelson et al. | |
| 7,327,285 B2 * | 2/2008 | McCauley et al. | 340/963 |
| 7,386,373 B1 * | 6/2008 | Chen et al. | 701/9 |
| 7,403,132 B2 * | 7/2008 | Khatwa | 340/970 |
| 2001/0013836 A1 * | 8/2001 | Cowie | 340/961 |

* cited by examiner

Primary Examiner—Michael J. Zanelli
(74) Attorney, Agent, or Firm—Ingrassia Fisher & Lorenz, P.C.

(57) ABSTRACT

Systems and methods for managing a visual display in a ground proximity warning system. In one embodiment, a system includes at least one aircraft sensor system operable to acquire aircraft data and a ground proximity warning computer coupled to the aircraft sensor system that is operable to process the aircraft data to generate ground proximity warning data corresponding to a sensed ground obstruction. An indicating system includes at least one visual display device that is operable to display terrain elevations and to display a visual symbol corresponding to at least one of the ground obstructions, wherein at least one of the computer and the visual display device is controllable to selectively alter an appearance of the visual symbol relative to the terrain elevations.

15 Claims, 3 Drawing Sheets

SYSTEM AND METHOD FOR MANAGEMENT OF A GROUND OBSTACLE DISPLAY

CROSS-REFERENCE TO RELATED APPLICATIONS

This application claims benefit of U.S. Provisional Application Ser. No. 60/674,223, filed Apr. 21, 2005, which is hereby incorporated by reference.

BACKGROUND OF THE INVENTION

Ground proximity warning systems (GPWS) are known and are presently installed on a wide variety of aircraft. Such systems generally provide both aural and visual warnings of inadvertent aircraft descent during flight operations. For example, a GPWS may be configured to detect an excessive loss of altitude during a landing procedure, following a take-off, or during a go-around following a missed landing approach. The GPWS also advantageously provides aural and visual warnings of potential terrain collisions during controlled flight over relatively high altitude terrain. In general, the GPWS detects an altitude loss by computing a barometric altitude (MSL), a geometric altitude, and/or a descent rate based upon changes in the barometric pressure. In cases where the terrain underlying the aircraft is rising relative to the aircraft, a radio altitude is computed in order to determine an altitude above ground level (AGL).

Although present ground proximity warning systems significantly enhance the safety of flight, other potentially hazardous terrain or man-made obstructions nevertheless exist. For example, radio transmission towers, smokestacks and other similar structures abruptly project outwardly from the terrain. Obstructions of the foregoing type are generally depicted in various aeronautical publications (including, for example, the well-known terminal area chart (TAC), sectional aeronautical chart (SAC) and world aeronautical chart (WAC)) and may also be represented in a variety of commonly available navigational databases that may be accessed by the ground proximity warning system so that a symbolic representation of obstacle may be displayed on a terrain awareness display (TAD) located within the aircraft.

Although the display of ground obstacles on a TAD constitutes a significant contribution to flight safety, various potential drawbacks may nevertheless exist. For example, the symbol associated with the ground obstacle may not be readily distinguishable from a terrain depiction on the TAD, so that a flight crew may fail to properly observe the obstacle on the TAD. In a further example, a color associated with a terrain depiction of a selected geographical location may not permit a color-coded ground obstruction symbol to be properly distinguished.

What is needed in the art is a system and method for managing a visual display so that ground obstructions may be effectively recognized by the flight crew.

BRIEF SUMMARY OF THE INVENTION

Systems and methods for managing a visual display in a ground proximity warning system are disclosed. In one aspect, a system includes at least one aircraft sensor system operable to acquire aircraft data and a ground proximity warning computer coupled to the aircraft sensor system that is operable to process the aircraft data to generate ground proximity warning data corresponding to a sensed ground obstruction. An indicating system includes at least one visual display device that is operable to display terrain elevations and to display a visual symbol corresponding to at least one of the ground obstructions, wherein at least one of the computer and the visual display device is controllable to selectively alter an appearance of the visual symbol relative to the terrain elevations.

BRIEF DESCRIPTION OF THE SEVERAL VIEWS OF THE DRAWING

The preferred and alternative embodiments of the present invention are described in detail below with reference to the following drawings.

DETAILED DESCRIPTION OF THE INVENTION

The present invention relates to ground proximity warning systems and methods. Many specific details of certain embodiments of the invention are set forth in the following description and in FIGS. 1 through 4 to provide a thorough understanding of such embodiments. One skilled in the art, however, will understand that the present invention may have additional embodiments, or that the present invention may be practiced without several of the details described in the following description. In the discussion that follows, it is understood that "color" describes a property of visible electromagnetic radiation that may be described in terms of dominant wavelength, luminance, and purity. Accordingly, visible electromagnetic radiation having a red color property corresponds to a range of wavelengths between approximately about 630 to 760 nanometers (nm), while visible radiation having a green color property corresponds to a range of wavelengths between approximately about 490 to 570 nm. A blue color property corresponds to a range of wavelengths between approximately about 420 to 490 nm, and a yellow color property corresponds to a range of wavelengths between approximately about 565 to 590 nm.

Figure 1:
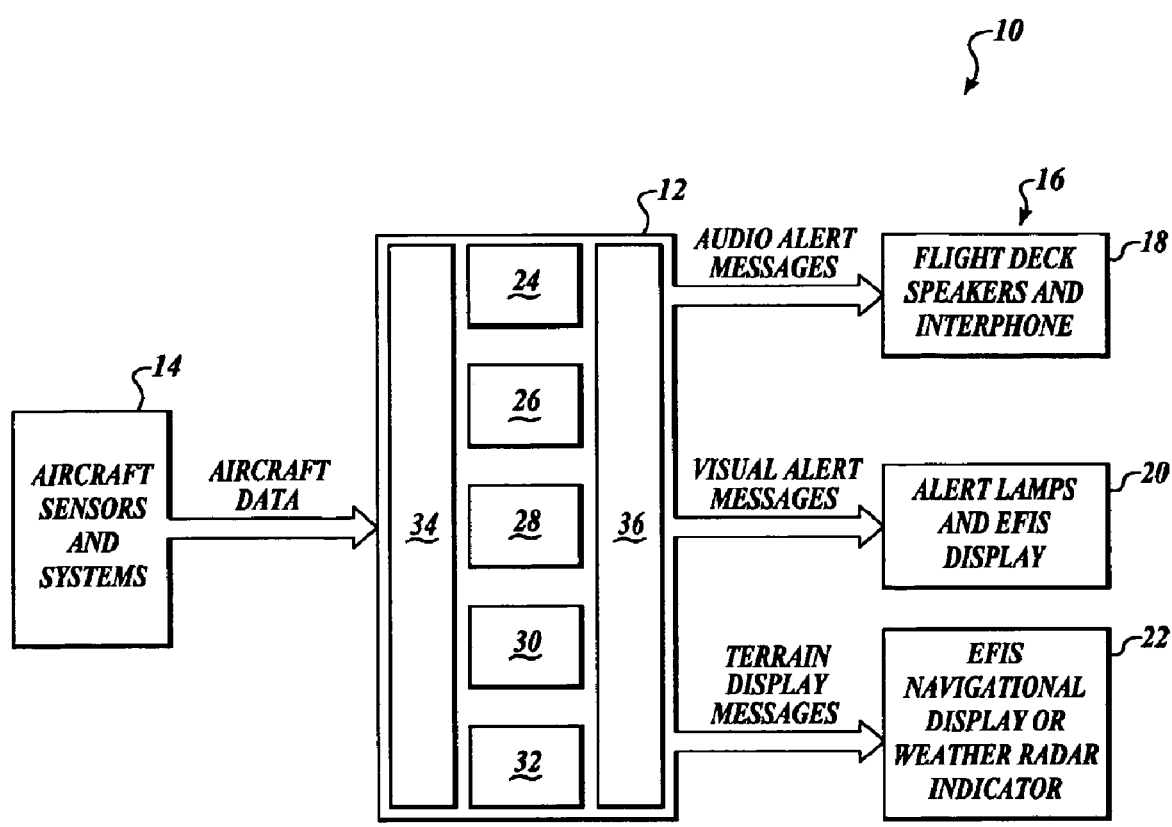
FIG. 1 is a block diagrammatic view of a ground proximity warning system according to an embodiment of the invention.

FIG. 1 is a block diagrammatic view of a ground proximity warning system 10 according to an embodiment of the invention. The system 10 includes a ground proximity-warning system (GPWS) computer 12 (or an enhanced GPWS (EG-PWS)) that is coupled to a plurality of aircraft sensors 14 and associated systems, including, for example, pitot-static sensors, a global positioning system (GPS), and an air data system. The system 10 is also coupled to one or more indicating systems 16, which are operable to convey audio and/or visual warnings to a flight crewmember. Accordingly, the one or more indicating systems 16 may include a flight deck speaker and interphone system 18, an alert lamp and electronic flight instrument system (EFIS) indicating system 20, and an EFIS navigational display and weather radar display system 22. The indicating systems 16 may also be coupled to various devices that permit a flight crewmember to communicate with the system 10. For example, the various devices may include a keyboard, a pointing device, including a "mouse" or a trackball, or other similar devices operable to transfer commands to the system 10.

The GPWS computer 12 includes one or more processors that are configured to perform a variety of functions. For example, the computer 12 may include a GPWS processor 24 that is operable to execute various algorithms to detect a ground (or obstacle) proximity event, and also includes algorithms configured to manage the display of obstacles on a selected display device, as will be described in greater detail below in connection with other embodiments of the invention. An aural callout processor 26 operable to generate audio warnings associated with ground (or obstacle) proximity events may also be present. A terrain awareness and obstacle alerting processor 28 is also present in the GPWS computer 12. The processor 28 is operable to process information from the systems 14 and to execute algorithms to obtain terrain obstacles so that appropriate warnings based upon the terrain obstacles may be obtained. A terrain clearance floor processor 30 may also be present in the GPWS computer 12. The processor 30 processes terrain floor algorithms to generate terrain floor information. A windshear detection and alerting processor 32 processes windshear algorithms and similarly generates windshear information for display. The computer 12 also includes an input processing module 34 that processes the signals obtained from the aircraft sensors and systems 14 to appropriately format the signals prior to transferring the signals to the GPWS processor 24, the aural callout processor 26, the terrain awareness and obstacle alerting processor 28, the terrain clearance floor processor 30, and the windshear detection and alerting processor 32. An output processing module 36 receives processed signals from the GPWS processor 24, the aural callout processor 26, the terrain awareness and obstacle alerting processor 28, the terrain clearance floor processor 30, and the windshear detection and alerting processor 32 and appropriately formats the processed signals before transferring the signals to the flight deck speaker and interphone system 18, the alert lamp and electronic flight instrument system (EFIS) indicating system 20, and/or the EFIS navigational display and weather radar display system 22.

Figure 2:
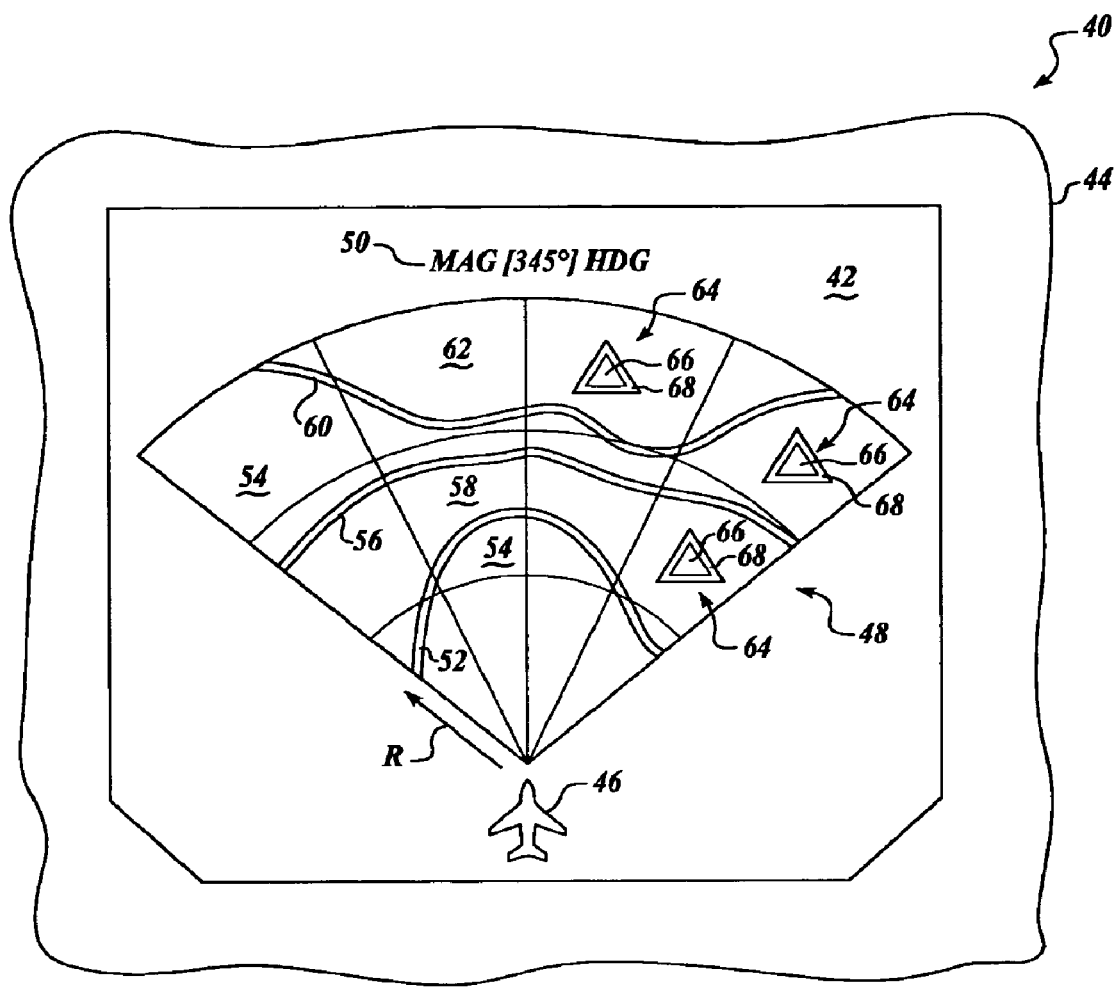
FIG. 2 is a ground obstacle depiction that illustrates a method of display management according to another embodiment of the invention.

FIG. 2 is a ground obstacle depiction 40 that will be used to describe a method of display management according to another embodiment of the invention. The ground obstacle depiction 40 may be presented to a viewer, such as a flight crewmember, on a viewing surface 42 of a terrain awareness display (TAD) 44 positioned within an aircraft cockpit. The TAD 44 may be the foregoing EFIS navigational display and weather radar display system 22 of FIG. 1, or other similar display devices. The TAD 44 is generally configured to display a symbolic representation 46 of the aircraft, and a viewing sector 48 that extends radially outwardly from the symbolic representation 46 of the aircraft. The TAD 44 is also configured to display terrain obstructions, aircraft traffic, navigational information and/or weather obstructions within a predetermined range and bearing relative to the aircraft. Accordingly, the viewing sector 48 also typically includes a directional bearing 50 of the aircraft. In general, the range R of the viewing sector 48 is selectable and alterable by a flight crew member to provide a desired resolution on the viewing surface 42 of the TAD 44.

The sector 48 also includes a graphical representation of terrain contours 52 that depict different terrain elevations in proximity to the aircraft. In the viewing sector 48 of FIG. 2, a first terrain contour 52 encloses a first terrain region 54, while a second terrain contour 56 and the first terrain contour 52 enclose a second terrain region 58. A third terrain contour 60 further encloses a third terrain region 62. The first terrain region 54, the second terrain region 58 and the third terrain region 62 are generally depicted on the viewing surface 42 using different colors that correspond to elevation differences. For example, a terrain elevation that is more than two-thousand feet below an aircraft altitude typically appears as a black area on the display surface 42, while a terrain elevation that is between approximately two-thousand feet below the aircraft altitude and up to the aircraft altitude is shown as a green area on the display surface 42. Terrain having an elevation that is above the aircraft altitude is shown as a yellow area if the terrain is between the aircraft altitude and extending up to approximately two thousand feet above the aircraft altitude. If a terrain elevation is more than about two thousand feet above the altitude of the aircraft, it is typically shown as a red area on the display surface 42. The terrain colors may also be dependent upon a threat level of the terrain as determined by the GPWS processor 24.

Still referring to FIG. 2, the viewing sector 48 may also include at least one ground obstruction symbol 64 that represents a ground obstacle such as a radio transmission antenna or a smokestack, or other similar ground-based obstructions. Although a triangular-shaped ground obstruction symbol 64 is shown, other symbol configurations are possible. For example, the ground obstruction symbol 64 may conform generally to ICAO standards for ground obstruction symbology so that the symbol has a predetermined shape based upon a height of the obstacle above the underlying terrain and/or based upon whether the obstacle is one of a ground obstruction, such as a radio antenna farm or an industrial installation having a plurality of towers or smokestacks, or other similar collections of obstructions.

In one embodiment, the ground obstruction symbol 64 includes an interior portion 66 and an outer peripheral portion 68 that substantially surrounds the interior portion 66. The interior portion 66 is depicted on the viewing surface 42 using different colors that generally correspond to a detected alert status for the associated ground obstruction. For example, a color of the interior portion 66 may be red as it is displayed on the viewing surface 44 if a "warning" alert level is detected. Alternately, the color of the interior portion 66 may be yellow as it is displayed on the viewing surface 44 if a "caution" alert level is detected. Accordingly, the interior portion 66 of the ground obstruction symbol 64 may not be readily distinguishable from the terrain regions 54, 58 and 62 because a color of the interior portion 66 and the color of the terrain regions 54, 58 and 62 are substantially similar.

Figure 3:
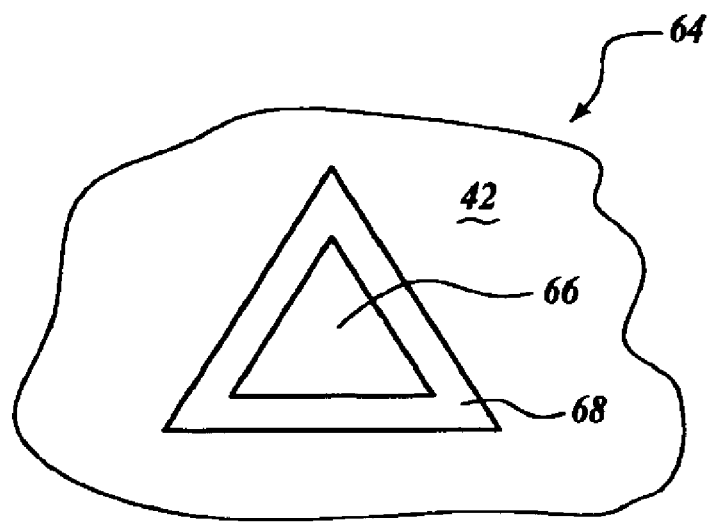
FIG. 3 is an enlarged, partial view of the viewing surface that is used to describe the ground obstruction symbol of FIG. 2 in greater detail.

FIG. 3 is an enlarged, partial view of the viewing surface 42 that will be used to describe the ground obstruction symbol 64 of FIG. 2 in greater detail. As noted earlier, the ground obstruction symbol 64 includes an interior portion 66 that may be depicted on the viewing surface 42 using a selected color that corresponds to a detected alert level. Since the selected color may not be properly distinguishable from a color of a terrain region that surrounds the ground obstruction symbol 64, a color of the outer peripheral portion 68 may be selected to provide a suitable visual contrast between the interior portion 66 and the color of the terrain region. For example, in one particular embodiment, the color of the outer peripheral portion 68 may be black when depicted on the viewing surface 42. Alternately, and in another particular embodiment, the peripheral portion 68 may be depicted using a color, texture or intensity that is complementary to a color of the interior portion 66. For example, when the interior portion 66 is depicted on the viewing surface 42 using a red color, the peripheral portion 68 may use a white or other color. If the interior portion 66 is depicted on the viewing surface 42 using a yellow color, one of white, or another color may be used, in order to provide a desired visual contrast.

Figure 4:
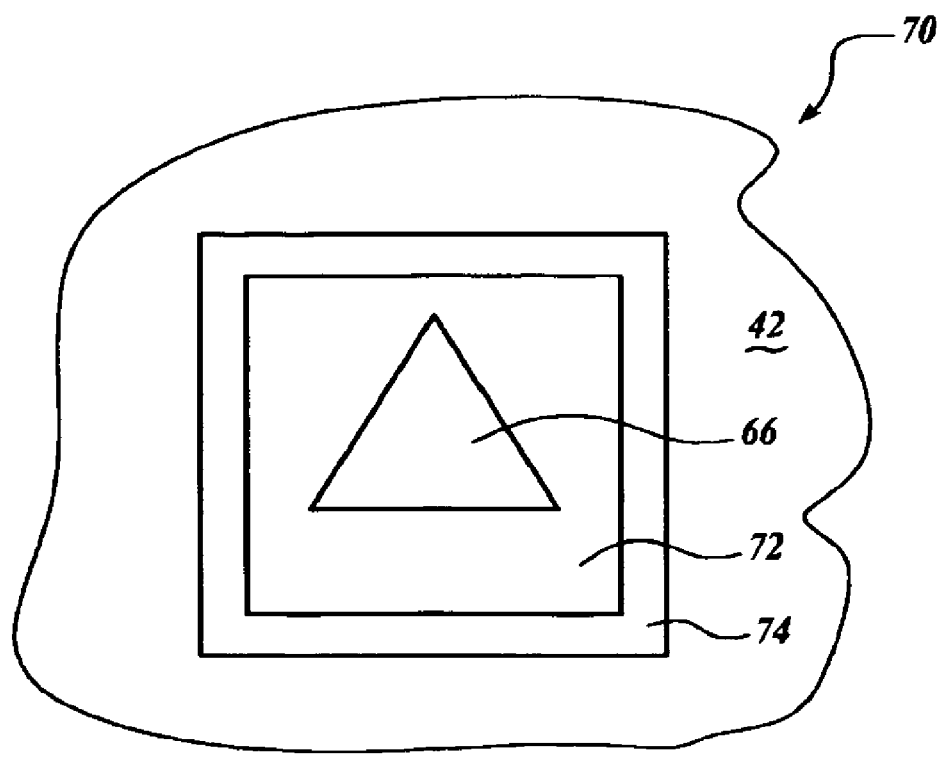
FIG. 4 is an enlarged, partial view of the viewing surface of FIG. 2 that is used to describe a ground obstruction symbol in accordance with another embodiment of the invention.

FIG. 4 is an enlarged, partial view of the viewing surface 42 of FIG. 2 that will be used to describe a ground obstruction symbol 70 in accordance with another embodiment of the invention. The ground obstruction symbol 70 includes the interior portion 66, as described in detail in connection with other embodiments, an intermediate portion 72 that substantially surrounds the interior portion 66, and an outer peripheral portion 74 that encloses the intermediate portion 72. The intermediate portion 72 is selectively displayed using a color that provides a desired visual contrast between the interior portion 66 and the intermediate portion 72. Additionally, the intermediate portion 72 and/or the outer peripheral portion 74 may be intermittently displayed, so that the intermediate portion 72 and/or the outer peripheral portion 74 is periodically presented on the viewing surface 42 according to a predetermined period so that attention is drawn to the ground obstruction symbol 70. Alternatively, the shape, color or intensity of the interior portion 66 may be altered to draw attention to the ground obstruction symbol 70.

Although the interior portion 66 of FIG. 3 and FIG. 4 displayed on the display surface 42 is illustrated as having a generally triangular shape, it is understood that other regular polygonal shapes may also be used. For example, the interior portion 66 may be a rectangular, circular or elliptical shape. Also, the shape may include means to convey more precisely the obstacle location within surface 66, e.g., a "filled dot".

While the preferred embodiment of the invention has been illustrated and described, as noted above, many changes can be made without departing from the spirit and scope of the invention. Also, the steps in the process 100 may be performed in various order. Accordingly, the scope of the invention is not limited by the disclosure of the preferred embodiment. Instead, the invention should be determined entirely by reference to the claims that follow.

What is claimed is:

1. A ground proximity warning system for an aircraft, comprising:
   a memory for storing one or more of ground or obstacle obstruction information;
   at least one aircraft sensor system operable to acquire aircraft data;
   a ground proximity warning computer coupled to the at least one aircraft sensor system that is operable to process the aircraft data to generate one or more of ground and obstacle proximity warning data; and
   at least one visual display device operable to display terrain elevations and to superimposingly display a visual symbol corresponding to at least one of the ground and obstacle obstructions,
      wherein the at least one of the computer and the visual display device is controllable to selectively alter an appearance of the visual symbol relative to the terrain elevations, and
      wherein the at least one of the computer and the visual display device is configured to generate the visual symbol and which corresponds to at least one of the ground and obstacle obstructions having an interior portion and an outer peripheral portion that surrounds the interior portion, and an intermediate portion positioned between the interior portion and the outer peripheral portion.

2. The ground proximity warning system of claim 1, wherein the at least one visual display device is further operable to display a selected terrain elevation using a first color, and to display the visual symbol corresponding to at least one of the ground or obstacle obstructions using at least one of the first color and a second color.

3. The ground proximity warning system of claim 2, wherein the second color is selected to provide a desired visual contrast in comparison to the first color.

4. The ground proximity warning system of claim 1, wherein the interior portion of the visual symbol includes one of a rectangular-shaped interior portion and a triangular-shaped interior portion.

5. The ground proximity warning system of claim 1, wherein at least one of the computer and the visual display device is configured to intermittently display at least one of the intermediate portion and the outer peripheral portion for at least one of a predetermined time period or as long the aircraft is within at least one of a warning or caution profile relative to an object associated with the visual symbol.

6. A method of display management for an aircraft ground proximity warning system, comprising:
   displaying terrain elevations on a visual display device;
   superimposingly displaying at least one visual symbol corresponding to a sensed ground obstruction on the visual display device, the at least one visual symbol including an interior portion, an outer peripheral region surrounding the interior portion, and an intermediate portion positioned between the interior portion and the outer peripheral portion; and
   controllably altering the visual display device to display a selected one of the terrain elevations in a first color and the at least one visual symbol using at least one of the first color and a second color.

7. The method of claim 6, wherein controllably altering the visual display device further comprises displaying the second color to provide a desired visual contrast in comparison to the first color.

8. The method of claim 6, wherein displaying a visual symbol that includes an interior portion and an outer peripheral region surrounding the interior portion further comprises displaying an intermediate region interposed between the interior portion and the outer peripheral portion.

9. A method of display management for an aircraft ground proximity warning system, comprising:
   generating terrain elevations and superimposingly generating visual symbols corresponding to sensed ground obstructions, the terrain elevations and the visual symbols adapted to be displayed on a visual display device, where the visual symbols further comprise displaying a visual symbol that includes an interior portion, an outer peripheral region surrounding the interior portion and an intermediate region interposed between the interior portion and the outer peripheral portion;
   displaying a selected one of the terrain elevations in a first color on a display device; and
   if the visual symbol is positioned within the selected one of the terrain elevations, displaying the visual symbol in a second color that provides a desired visual contrast when compared to the first color.

10. The method of claim 9, wherein generating terrain elevations and visual symbols further comprises generating the terrain elevations and visual symbols in at least one of a ground proximity warning computer and an indicating system coupled to the ground proximity warning computer.

11. The method of claim 10, wherein displaying the terrain elevations further comprises displaying the terrain elevations on a terrain awareness display (TAD).

12. The method of claim 9, wherein displaying an intermediate region interposed between the interior portion and the outer peripheral portion further comprises intermittently displaying at least one of the intermediate portion and the outer peripheral portion for at least one of a predetermined time period or as long the aircraft is within at least one of a warning or caution profile relative to an object associated with the visual symbol.

13. A method of display management for an aircraft ground proximity warning system, comprising:
    displaying terrain regions corresponding to elevations on a visual display device;
    superimposingly displaying at least one visual symbol corresponding to a sensed ground obstruction on the visual display device, the at least one visual symbol including an interior portion, an outer peripheral region surrounding the interior portion and an intermediate region interposed between the interior portion and the outer peripheral portion, the visual symbol having a first color corresponding to a first alert condition; and
    if the selected visual symbol is positioned within a selected terrain region having the first color, altering the color of the visual symbol to provide a visual symbol having a second color.

14. The method of claim 13, wherein displaying at least one visual symbol corresponding to a sensed ground obstruction further comprises displaying a visual symbol having a first portion and a second portion, further wherein at least one of the first portion and the second portion is alterable to display the second color.

15. The method of claim 14, wherein displaying a visual symbol having a first portion and a second portion further comprises displaying the first portion within the second portion.

* * * * *